United States Patent
Ang et al.

(10) Patent No.: US 10,920,582 B2
(45) Date of Patent: Feb. 16, 2021

(54) SYSTEMS AND METHODS TO USE TRIANGULATION THROUGH ONE SENSOR BEAMFORMING IN DOWNHOLE LEAK DETECTION

(71) Applicant: Halliburton Energy Services, Inc., Houston, TX (US)

(72) Inventors: Yi Yang Ang, Singapore (SG); Nam Nguyen, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 429 days.

(21) Appl. No.: 15/741,989

(22) PCT Filed: May 25, 2017

(86) PCT No.: PCT/US2017/034494
§ 371 (c)(1),
(2) Date: Jan. 4, 2018

(87) PCT Pub. No.: WO2018/217207
PCT Pub. Date: Nov. 29, 2018

(65) Prior Publication Data
US 2018/0371897 A1    Dec. 27, 2018

(51) Int. Cl.
*E21B 47/113* (2012.01)
*G01V 11/00* (2006.01)
(Continued)

(52) U.S. Cl.
CPC .............. *E21B 47/113* (2020.05); *G01V 1/40* (2013.01); *G01V 11/002* (2013.01); *E21B 47/10* (2013.01); *E21B 47/107* (2020.05)

(58) Field of Classification Search
CPC .................................. E21B 47/10; G01M 3/40
See application file for complete search history.

(56) References Cited

U.S. PATENT DOCUMENTS 4,114,721 A * 9/1978 Glenn, Jr. .............. E21B 47/101
                                                      181/102
4,711,303 A   12/1987 Koeling et al.
(Continued)

FOREIGN PATENT DOCUMENTS

CA          2663497 C      4/2014
WO    2015004487 A2      1/2015
(Continued)

OTHER PUBLICATIONS

Cigada, Alfredo, et al. "Moving microphone arrays to reduce spatial aliasing in the beamforming technique: Theoretical background and numerical investigation." The Journal of the Acoustical Society of America 124.6 (2008): 3648-3658.
(Continued)

*Primary Examiner* — Kyle R Quigley
(74) *Attorney, Agent, or Firm* — McGuireWoods LLP

(57) ABSTRACT

A method includes obtaining physical signals detected by a physical sensor traveling along a wellbore. The method also includes performing a first and second frame decomposition operations on a first and second set of physical signals detected by the physical sensor at first and second locations to obtain first and second pluralities of virtual signals associated with first and second arrays of virtual sensors. Each virtual sensor of the first and second arrays of virtual sensors is located at a virtual distance relative to the first and second locations, and the virtual distance corresponds to a physical distance. Additionally, the method includes computing first and second direction of arrival estimates of the first and second locations of the single physical sensor relative to a location of a downhole leak. Further, the method includes triangulating the first and second direction of arrival estimates to estimate the location of the downhole leak.

18 Claims, 8 Drawing Sheets

(51) Int. Cl.
*G01V 1/40* (2006.01)
*E21B 47/10* (2012.01)
*E21B 47/107* (2012.01)

(56) References Cited

U.S. PATENT DOCUMENTS

| | | | |
|---|---|---|---|
| 4,930,111 A | 5/1990 | Sullivan et al. | |
| 7,894,300 B2 | 2/2011 | Hawthorn et al. | |
| 8,789,587 B2 | 7/2014 | Tubel et al. | |
| 2010/0268489 A1* | 10/2010 | Lie | E21B 47/101 702/51 |
| 2011/0188346 A1* | 8/2011 | Hull | E21B 47/101 367/35 |
| 2014/0025319 A1* | 1/2014 | Farhadiroushan | G01S 5/18 702/56 |

FOREIGN PATENT DOCUMENTS

| | | |
|---|---|---|
| WO | 2015013394 A1 | 1/2015 |
| WO | 2015035060 A1 | 3/2015 |
| WO | 2015108668 A1 | 7/2015 |
| WO | 2016010553 A1 | 1/2016 |
| WO | 2016108914 A1 | 7/2016 |
| WO | 2016209388 A1 | 12/2016 |
| WO | 2017062015 A1 | 4/2017 |

OTHER PUBLICATIONS

Xenaki, Angeliki, and Peter Gerstoft. "Grid-free compressive beamforming." The Journal of the Acoustical Society of America 137.4 (2015): 1923-1935.
International Search Report and Written Opinion dated Nov. 30, 2017; International PCT Application No. PCT/US2017/034494.

* cited by examiner

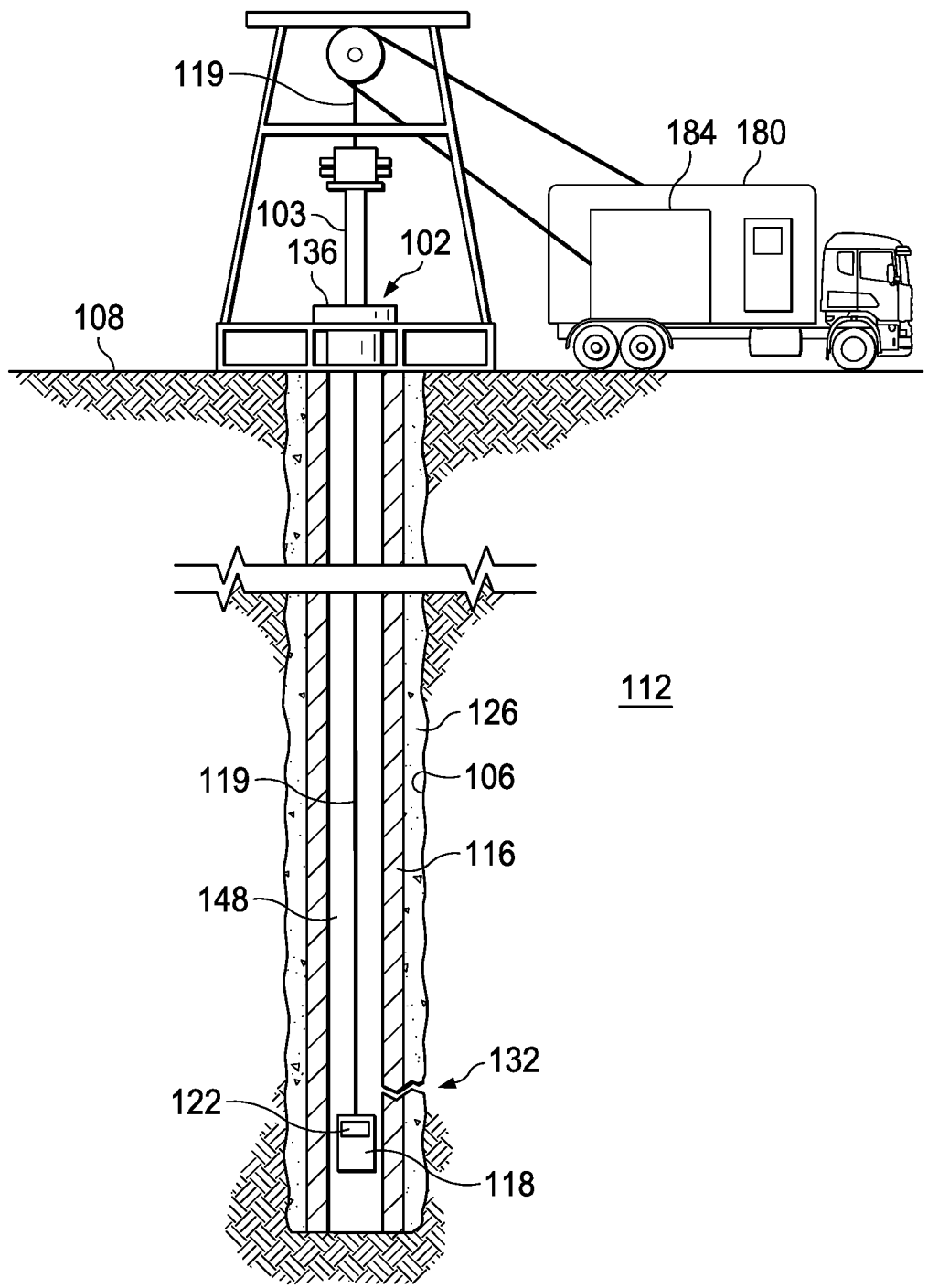

SYSTEMS AND METHODS TO USE TRIANGULATION THROUGH ONE SENSOR BEAMFORMING IN DOWNHOLE LEAK DETECTION

BACKGROUND

The present disclosure relates generally to systems and methods to estimate a leak location within a well using triangulation of multiple virtual estimates of the leak location.

A wellbore is often drilled proximate to a subterranean deposit of hydrocarbon resources to facilitate exploration and production of hydrocarbon resources. Casing sections are often coupled together to extend an overall length of a casing (e.g., a production casing, an intermediate casing, or a surface casing) that is deployed in the wellbore to insulate downhole tools and strings deployed in the casing as well as hydrocarbon resources flowing through casing from the surrounding formation, to prevent cave-ins, and/or to prevent contamination of the surrounding formation. A cement job is usually performed to fixedly secure the casing to the wellbore and to form a barrier that isolates different zones of the wellbore. Over time, the casing and/or the cement sheath may weaken, and one or more leaks may form at different sections of the casing and/or cement sheath. Reservoir fluids that were previously isolated from the casing or isolated from one or more sections of the casing by the cement sheath may leak through the cement sheath and may affect the integrity of the well and jeopardize hydrocarbon production.

Sensors are sometimes deployed downhole to monitor leaks. For example, sensors are sometimes mixed with cement and are fixedly deployed along the cement. Although stationary sensors may be used to detect leaks, sometimes, the stationary sensors are not deployed proximate to the leaks, and do not provide accurate information regarding the locations of the leaks. An array of multiple sensors (sensor array) is sometimes deployed along a production tubing, which extends down the wellbore. One or more sensors of the sensor array may be positioned proximate to the leak and may be operable to detect the leak. Measurements made by different sensors of the sensor array may also be compared to obtain more accurate information regarding the leak. However, the cost associated with fitting a production tubing with multiple sensors, deploying the multiple sensors, and operating the multiple sensors increases proportionally with the number of sensors deployed in the sensor array. Further, in certain wellbore environments, it may be difficult and/or impractical to deploy multiple sensors, thereby impacting leak detection accuracy of the sensor array. Further, one or more sensors of the sensor array may malfunction, which would also adversely impact the accuracy of leak information obtained by the sensor array.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1A is a schematic, side view of a logging environment in which a leak detector having a physical sensor operable to detect leaks along a wellbore is deployed on a conveyance in the wellbore;

Figure 1B:
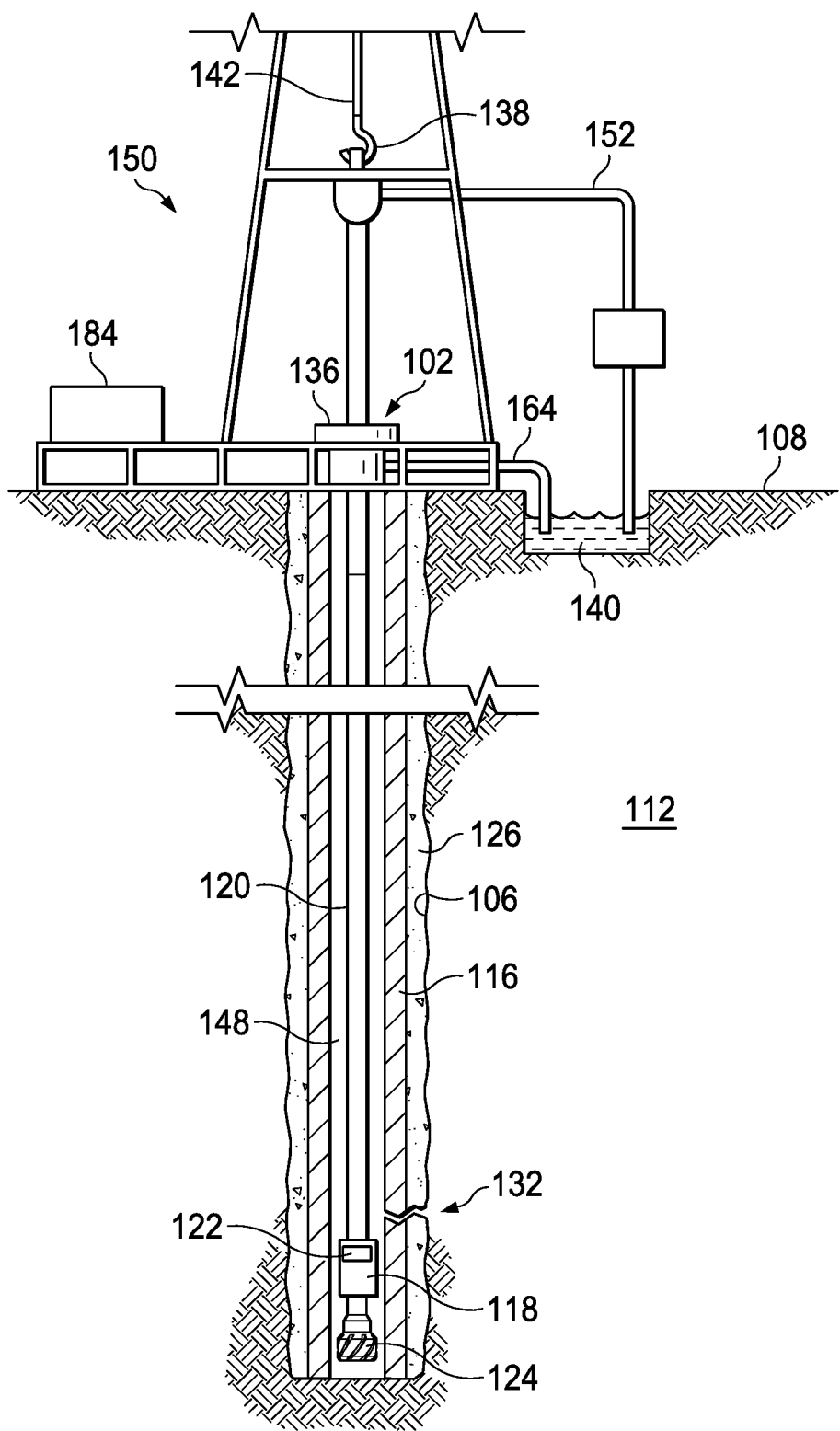
FIG. 1B is a schematic, side view of a logging while drilling (LWD) environment in which the leak detector of FIG. 1A is deployed in the wellbore to detect leaks along the wellbore.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be used and that logical structural, mechanical, electrical, and chemical changes may be made without departing from the spirit or scope of the disclosed subject matter. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to use at least one physical sensor to provide spatial resolution for leak detection, as well as downhole leak detectors having at least one physical sensor and operable to provide spatial resolution in leak detection. As defined herein, a physical sensor is an actual sensor that is deployed in a wellbore of a downhole environment and is operable to detect downhole leaks along the wellbore. More particularly, the physical sensor is deployed along a retractable string, such as a wireline tool string, a slickline tool string, a drill string, or another type of tool string operable to deploy the physical sensor. The retractable tool string may be deployed in a wellbore and retracted from the wellbore to facilitate the leak detector to travel between a surface location and a desired depth of the wellbore. In some embodiments, the physical sensor is a hydrophone that is operable to obtain acoustic signals indicative of the leak and originating from a source of the leak. In other embodiments, the physical sensor is an optical fiber that is operable to perform distributed acoustic sensing (DAS) or distributed strain sensing of disturbances caused by the leak. In other embodiments, the physical sensor is an electromagnetic detector operable to obtain electromagnetic signals indicative of the leak and originating from the source of the leak. In further embodiments, the physical sensor is a chemical detector operable to detect chemical imbalances caused by the leak.

As the leak detector travels up and/or down the wellbore, the physical sensor is operable to obtain physical signals indicative of the leak as detected by the physical sensor. As defined herein, "up the wellbore" and "down the wellbore" mean traveling along the wellbore towards a surface end of the wellbore, and traveling along the wellbore away from the surface end of the wellbore, respectively.

The leak detector is further operable to perform a frame decomposition operation on the physical signals detected by the physical sensor. In some embodiments, the frame decomposition operation obtains a plurality of virtual signals associated with an array of virtual sensors, where each virtual sensor of the array of virtual sensors is located at a virtual distance relative to the physical sensor. As defined herein, a virtual sensor is deployed at a virtual location and a virtual distance from the physical sensor, where the virtual location and the virtual distance have values that mimic values of a physical location and a physical distance from the physical sensor, respectively. Further, the virtual sensor is a sensor that mimics a physical sensor such that virtual signals associated with the virtual sensor are approximately equal to physical signals that a physical sensor would detect if the physical sensor is located at a physical location that corresponds to the virtual location of the virtual sensor. For example, the leak detector is operable to perform the frame decomposition operation to obtain virtual signals for eight virtual sensors, located at the location of the physical sensor and at least D-7D from the location of the physical sensor, where D is a numerical value of a physical distance from the physical sensor. The virtual signals of each virtual sensor of eight virtual sensors are approximately equal to physical signals obtained by the physical sensor if the physical sensor is located at the location of the respective virtual sensor.

The leak detector then correlates the obtained virtual signals. For example, the leak detector constructs a covariance matrix of the virtual signals obtained from the frame decomposition operation. The leak detector then adjusts values obtained from the covariance matrix to synchronize the plurality of virtual signals. The leak detector then computes a spatial spectrum indicative of a location of a leak based on the synchronized virtual signals and uses a beamforming technique, such as traditional beamforming, Capon's beamforming, MUSIC, parametric analysis, azimuthal analysis, and similar techniques to determine a localized peak of the spatial spectrum, where the localized peak is indicative of the location of the leak. This process generates a virtual sub one-sensor array (SOSA). Multiple virtual SOSAs are able to perform estimates independently from one another using the process described above with different locations of the physical sensor. Triangulation of localization estimates (e.g., direction of arrival estimates) collected from the multiple SOSAs achieves an estimate with a greater probability of detecting a precise leakage location. Additional descriptions of the foregoing processes, exemplary formulas, and examples are provided in the paragraphs below and are illustrated in FIGS. 1-9. Further, although the foregoing operations are described to be performed by the leak detector, the operations may also be performed by a processor of another electronic device, such as a surface based controller that is communicatively connected to the physical sensor and operable to receive the physical signals detected by the physical sensor.

Turning now to the figures, FIG. 1A is a schematic, side view of a downhole logging environment 100 in which a leak detector 118 having a physical sensor 122 operable to detect leaks along wellbore 106 is deployed on conveyance 119 in the wellbore 106. In the embodiment of FIG. 1, a well 102 having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is surrounded by a cement sheath 126, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying the conveyance 119 is positioned proximate the well 102. The conveyance 119 along with the leak detector 118 and the physical sensor 122 are lowered through the blowout preventer 103 into the well 102. The conveyance 119 can include wireline, slickline, coiled tubing, pipe, downhole tractor, or some combination thereof. In one or more embodiments, power can be supplied to the leak detector 118 and the physical sensor 122 via the conveyance 119. Alternatively to or in conjunction with power in the conveyance 119, the leak detector 118 and the physical sensor 122 can be powered by one or more batteries. Data indicative of measurements obtained by the physical sensor 122 and/or processed by the leak detector 118 may be stored in memory or a storage medium within the leak detector 118 (discussed below) and/or may be transmitted via the conveyance 119 or via another telemetry system to the surface 108 for processing by controller 184 or by another electronic device operable to process data obtained by the physical sensor 122 and the leak detector 118. In the embodiment of FIG. 1A, the controller 184 is stored on the vehicle 180. In some embodiments, the controller 184 may also be housed in a temporary and/or permanent facility (not shown) proximate the well 102. In other embodiments, the controller 184 may also be deployed at a remote location relative to the well 102. Additional operations of the controller 184 are provided in the paragraphs below.

FIG. 1B is a schematic, side view of a logging while drilling (LWD) environment 150 in which the leak detector 118 of FIG. 1A is deployed in the wellbore 106 to detect leaks along the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string, or another type of tool string operable to deploy the leak detector 118. At wellhead 136, an inlet conduit 152 is coupled to a fluid source (not shown) to provide fluids, such as drilling fluids, downhole. The tool string 120 has an internal annulus that provides a fluid flow path from the surface 108 down to the leak detector 118. The tool string 120 is coupled to the leak detector 118, which in the embodiment of FIG. 1B, includes the physical sensor 122. The fluids travel down the tool string 120, and exit the tool string 120 at drill bit 124. The fluids flow back towards the surface 108 through a wellbore annulus 148 and exit the wellbore annulus 148 via an outlet conduit 164 where the fluids are captured in a container 140.

The physical sensor 122 is operable to detect the presence of leaks, such as first leak 132. In the examples of FIGS. 1A and 1B, the first leak 132 represents a leak in the cement sheath 126. As the physical sensor 122 traverses along the longitudinal axis of the wellbore 106, signals indicative of the first leak 132 are detected (physical signals) by the physical sensor 122. The leak detector 118 performs a frame decomposition operation on the physical signals detected by the physical sensor 122 to obtain virtual signals associated with an array of virtual sensors and constructs a covariance matrix of the plurality of virtual signals. The leak detector 118 then adjusts the covariance matrix to synchronize the plurality of virtual signals. In some embodiments, for each virtual sensor of the array of virtual sensors, the leak detector 118 determines a true steering vector of virtual signals corresponding to the respective virtual sensor, and applies the true steering vector to one or more values of the covariance matrix that represents the virtual signals corresponding to the respective virtual sensor. In further embodiments, for each virtual sensor of the array of virtual sensors, the leak detector 118 also determines a temporal correction factor of the virtual signals corresponding to the respective virtual sensor. In such embodiments, the leak detector 118 also determines a modeled transfer function of the virtual signals corresponding to the respective virtual sensor. The leak detector 118 then calculates a virtual weight of the respective virtual sensor relative the physical sensor based on the determined temporal correction factor and the modeled transfer function of the virtual signals corresponding to the respective virtual sensor. The leak detector 118 then applies the true steering vector and the virtual weight to one or more values of the covariance matrix that represent the virtual signals corresponding to the respective virtual sensor.

The leak detector 118 then computes a spatial spectrum indicative of a location of the first leak 132 based on the synchronized virtual signals. In some embodiments, the leak detector 118 uses a beamforming technique to determine a localized peak of the spatial spectrum, where the localized peak is indicative of the location of the first leak 132. Examples of the beamforming techniques include traditional beamforming, Capon's beamforming, MUSIC, parametric analysis, azimuthal analysis, and similar techniques to determine the localized peak. In some embodiments, the leak detector 118 is further operable to determine an approximate radial distance of the first leak 132 relative to the physical sensor 122. In one of such embodiments, the radial distance includes a first component having a value along a first x-axis, and includes a second component having a value along a second y-axis, where the x-axis and y-axis are perpendicular axes that form a plane that is approximately perpendicular to a longitudinal axis (z-axis) of the wellbore 106. For example, if the physical sensor 122 is positioned at (x, y)=(0m, 0m), then the radial distance of the first leak 132 may indicate that the first leak 132 is (2m, 3m) relative to the physical sensor 122. In another one of such embodiments, the radial distance includes a first component having a value along a first x-axis, a second component having a value along a second y-axis, and a third component having a value along a z-axis, where the x-axis and y-axis are perpendicular axes that form a plane that is approximately perpendicular to a longitudinal axis (z-axis) of the wellbore 106. For example, if the physical sensor 122 is positioned at (x, y, z)=(0m, 0m, 0m), then the radial distance of the first leak 132 may indicate that the first leak 132 is (2m, 3m, 5m) relative to the physical sensor 122. In further embodiments, the leak detector 118 is further operable to determine one or more angles of the first leak 132 relative to the physical sensor 122. In one of such embodiments, an angle of the first leak 132 is indicative of an azimuth of the first leak 132 relative to the physical sensor 122. In another one of such embodiments, an angle of the leak 132 is indicative of the altitude of the leak 132 relative to the physical sensor 122. As used herein, the term "approximately" may indicate that a value of interest is maintained within 5% of a target of the value of interest.

This process may be repeated several times to collect data from multiple arrays of virtual sensors (i.e., sub one-sensor arrays (SOSAs)). Each of the SOSAs perform estimations of a location of the first leak 132 independently from the other SOSAs. Through this technique, localization of the first leak 132 is achieved through triangulation of all of the location estimates of the SOSAs. Additionally, because the location estimates are independent, the SOSAs may be weighted independently based on Cramer-Rao Bound stitching of images representing data captured by the leak detector 118 for each of the SOSAs.

Although the leak detector 118 has been described thus far as operable to perform the operations described in the foregoing paragraphs, in one or more embodiments the foregoing operations may also be wholly or partially performed by other surface based or downhole electronic devices communicatively connected to the leak detector 118 and operable to receive the physical signals detected by the physical sensor 122. For example, the controller 184, which is formed by one or more electronic devices, is operable to receive the detected physical signals and to perform the foregoing operations to compute spatial spectrums indicative of the location of the first leak 132. Additional descriptions of the algorithms used to perform the foregoing operations are provided in the paragraphs below and are illustrated in at least FIGS. 2-9. Further, although FIGS. 1A and 1B illustrate the leak detector 118 and the sensor 122 deployed in two exemplary environments, the leak detector 118 and the sensor 122 may be deployed in various drilling, completion, and production environments. Further, although FIGS. 1A and 1B illustrate the leak detector 118 having one sensor 122, in some embodiments, the leak detector 118 is operable to use measurements obtained by multiple sensors (not shown) to perform operations described herein to obtain a plurality of virtual sensors, synchronize virtual signals of the plurality of virtual sensors, and to compute a spatial spectrum indicative of a location of the first leak 132 or another leak in the wellbore 106 based on the synchronized virtual signals.

Figure 2:
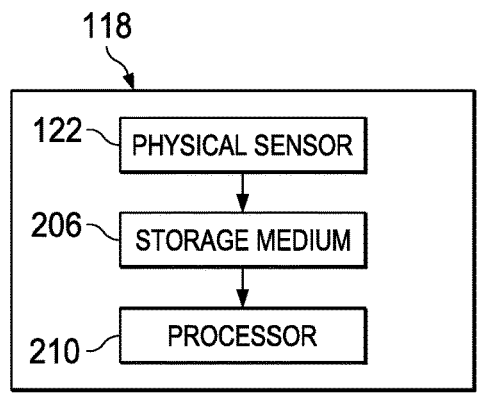
FIG. 2 illustrates a block diagram of components of the downhole leak detector of FIG. 1.

FIG. 2 illustrates a block diagram of components the first downhole leak detector 118 of FIG. 1. The downhole leak detector 118 includes the physical sensor 122. In some embodiments, the physical sensor 122 is a hydrophone that is operable to obtain acoustic signals (physical signals) indicative of the leak and originating from a source of the leak. In other embodiments, the physical sensor 122 is an optical fiber that is operable to perform distributed acoustic sensing (DAS) or distributed strain sensing of disturbances caused by the first leak 132 to detect the physical signals. In further embodiments, the physical sensor 122 is an electromagnetic sensor operable to transmit electromagnetic signals that traverse the subterranean formation 112, and to detect variations to transmitted electromagnetic signals as well as secondary electromagnetic signals induced by the first leak 132 and/or by the subterranean formation 112. In further embodiments, the physical sensor 122 is operable to detect nuclear magnet resonance signals of particles of the subterranean formation 112 and/or fluids flowing through the first leak 132. In further embodiments, the physical sensor 122 is operable to detect one or more of a vibration, displacement, velocity, torque, acceleration, conductivity, acoustic impedance, and other properties of the wellbore 106 at a location proximate to the first leak 132.

The leak detector 118 also includes a storage medium 206. The storage medium 206 is a machine-readable medium and may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. Physical signals detected by the physical sensor 122, as well as virtual signals associated with virtual sensors are stored on the storage medium 206. The storage medium 206 also includes instructions for operating the leak detector 118 as well as instructions for establishing communications with other downhole and surface based electronic devices such as the controller 184.

The leak detector 118 also includes a processor 210 that is operable to execute the instructions stored in the storage medium 206 to obtain the physical signals detected by the physical sensor 122 as the physical sensor 122 travels along the wellbore 106. The processor 210 is also operable to perform a frame decomposition operation on the physical signals of the physical sensor 122 to obtain a plurality of virtual signals associated with an array of virtual sensors. Further, the processor 210 is operable to construct a covariance matrix of the plurality of the virtual signals obtained from the frame decomposition operation. The processor 210 is also operable to adjust values of the covariance matrix to synchronize the plurality of the virtual signals. The processor 210 is further operable to compute a spatial spectrum indicative of a location of the leak based on the synchronized virtual signals. The processor 210 is further operable to use a beamforming technique disclosed herein to determine a localized peak of the spatial spectrum, where the localized peak is indicative of the location of the leak. Moreover, the processor 210 is operable to generate a direction of arrival estimation for each of the SOSA estimations, and the processor 210 is operable to provide localization estimates of the first leak 132 based on the direction of arrival estimations. Furthermore, the processor 210 is operable to triangulate the localization estimates of the first leak 132 to generate a spatial representation of the first leak 132. In one of such embodiments, the processor 210 is housed within a casing of the leak detector 118.

Although FIG. 2 illustrates the processor 210 as a component of the leak detector 118, in other embodiments, a processor of a surface based electronic device (surface based processor), such as the controller 184 is also operable to perform the operations of the processor 210. In one of such embodiments, physical signals obtained by the sensor 122 are transmitted to the controller 184 via one or more downhole telemetry systems. The surface based processor is operable to perform the operations described herein to perform a frame decomposition operation on the physical signals to obtain a plurality of virtual signals associated with an array of virtual sensors, construct a covariance matrix of the plurality of the virtual signals obtained from the frame decomposition operation, adjust values of the covariance matrix to synchronize the plurality of virtual signals, compute a spatial spectrum indicative of a location of the leak based on the synchronized signals, use beamforming to determine a localized peak of the spatial spectrum, provide direction of arrival estimations for each of the SOSAs, triangulate the direction of arrival estimations for the SOSAs to determine the location of the leak with greater accuracy than using a single virtual sensor array, provide a spatial representation of the location of the leak, as well as other operations described herein. In further embodiments, the processor 210 is a sub-component of the physical sensor 122. In further embodiments, the processor 210 is a separate component that is deployed at a downhole location and is operable to perform the operations described herein to compute the spectral spectrum indicative of the location of the first leak 132. In each of the foregoing embodiments, the processor 210 and the leak detector 118 form a leak detection system that performs the operations described herein to compute a spatial spectrum indicative of a location of a leak based on the synchronized virtual signals. Additionally, processing of data collected by the leak detector 118 may occur at both the surface 108 and downhole within the wellbore 106 simultaneously.

Figure 3A:
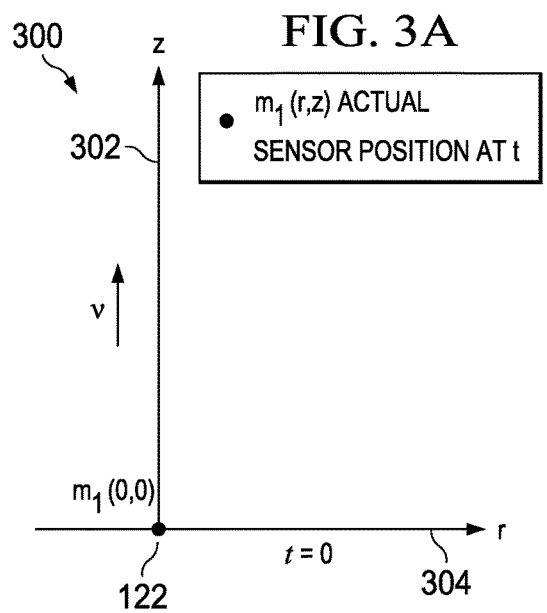
FIG. 3A illustrates a schematic view of the physical sensor of FIG. 1 at time t=0 as the physical sensor travels along a longitudinal axis (z-axis) of the wellbore at a velocity equal to v.
Figure 3B:
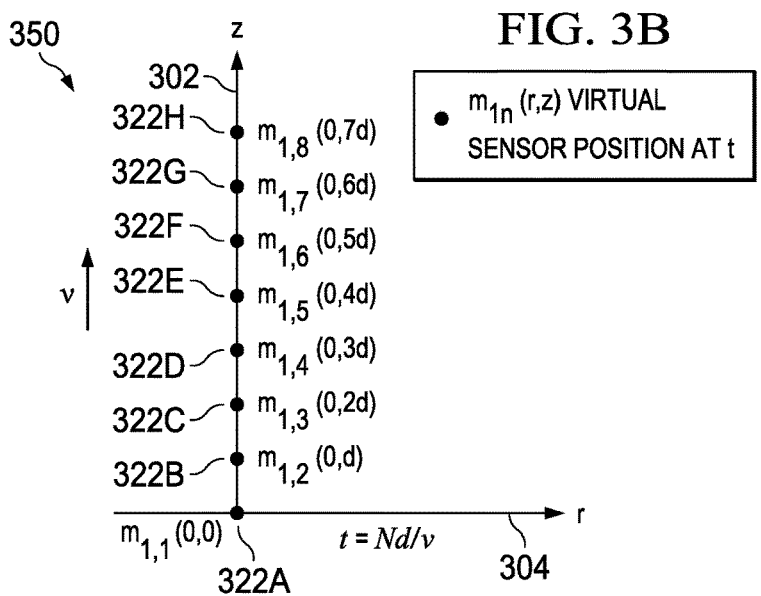
FIG. 3B illustrates an array of virtual sensors formed based on the physical sensor of FIG. 3A as the physical sensor travels along the z-axis a longitudinal axis of the wellbore at velocity v.

FIG. 3A illustrates a schematic view 300 of the physical sensor 122 of FIG. 1 at time t=0 as the physical sensor 122 travels along a longitudinal axis (z-axis) 302 of the wellbore at a velocity equal to v. At time t=0, the location of the physical sensor 122 along an r-axis 304 and the z-axis 302 is (0, 0). As the physical sensor 122 travels along the z-axis, samples of physical signals detected by the physical sensor 122 are decomposed utilizing a frame decomposition operation into multiple frames, where the quasi-stationary condition of each frame may be preserved. A discrete time signal is quasi-stationary if its first and second order statistics are finite and well defined. Each frame of the multiple decomposed frames is used to form a virtual sensor of the array of virtual sensors 322A-322H. FIG. 3B illustrates a schematic view 350 of an array of virtual sensors 322A-322H formed based on the physical sensor 122 of FIG. 3A as the physical sensor 122 travels along the z-axis 302 of the wellbore 106 at velocity v. Each virtual sensor is associated with virtual signals, which approximate physical signals that would be detected by the physical sensor 122 if the physical sensor 122 is at the location of the respective virtual sensor. Once the array of virtual sensors 322A-322H is formed, a covariance matrix may be constructed using the virtual signals and may be subsequently adjusted using one or more operations described herein to compute a spatial spectrum indicative of the location of the leak. As used herein, the velocity v may generally be approximately constant as the physical sensor travels along the z-axis 302 of the wellbore 106. The term "approximately constant" indicates that the velocity v is maintained within a range of 10% of the target velocity v while the physical sensor 122 travels along the z-axis 302.

Figure 4:
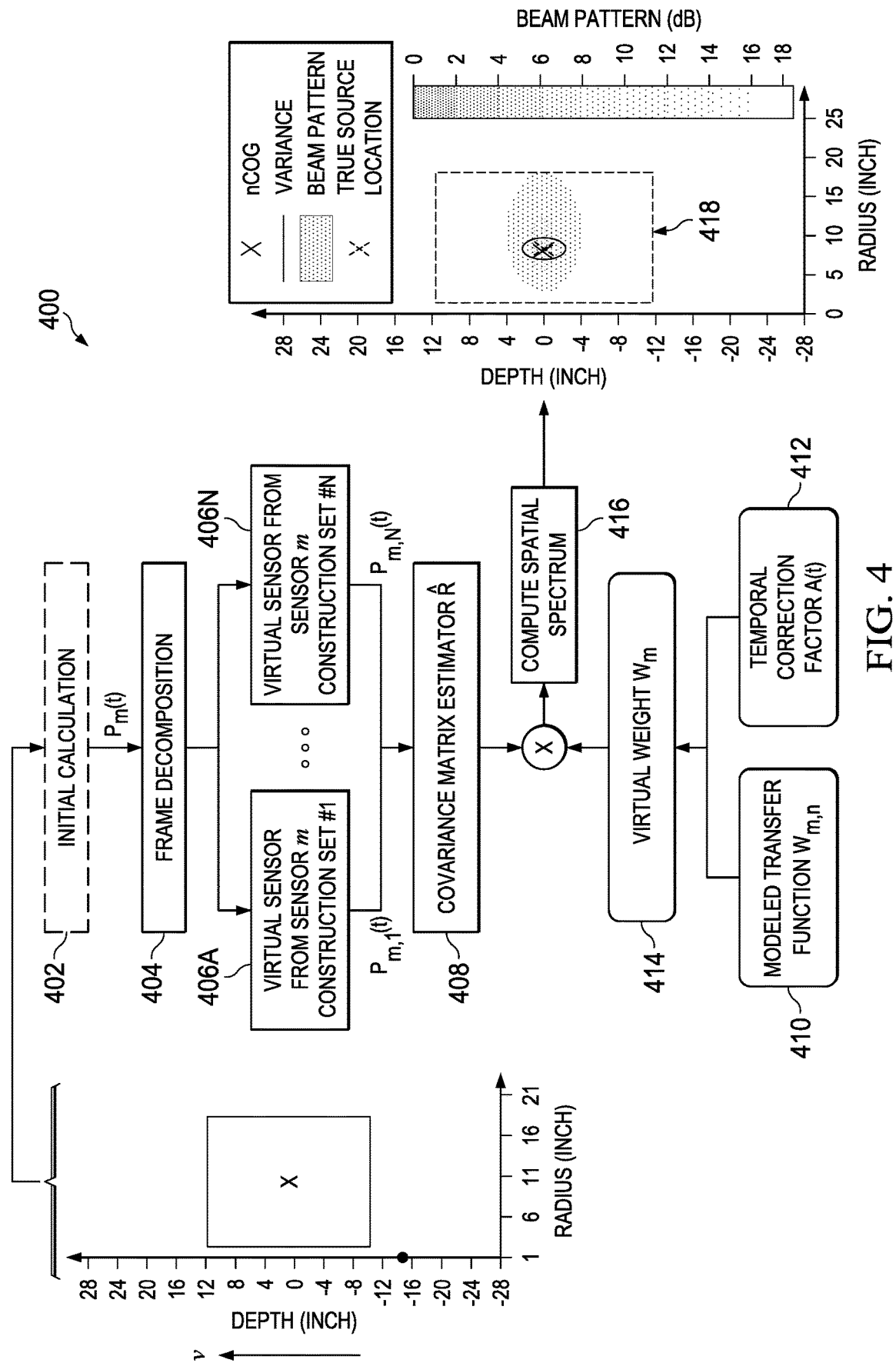
FIG. 4 illustrates a block diagram of a process for utilizing a virtual array formed from one physical sensor (one sensor array) such as the physical sensor of FIG. 1 to compute a spatial spectrum indicative of a location of the leak, such as the first leak of FIG. 1.

FIG. 4 illustrates a block diagram of a process 400 for utilizing a virtual array formed from one physical sensor (one sensor array) such as the physical sensor 122 of FIG. 1 to compute a spatial spectrum indicative of a location estimation of a leak, such as the first leak 132 of FIG. 1. At block 402, initial calculations are performed to determine the initial position of the physical sensor 122. In the example of FIG. 4, the physical sensor 122 ($m_1$) is initially located at origin where the location of the physical sensor 122 across two perpendicular axes x and y is expressed as (x, y)=(0, 0). The physical sensor 122 is operable to detect a near field leaking source signal in free-field propagation, $S_0(t)$, where the leaking source signal is located at a spatial position of $r_0=(x_0, y_0)$. Further, the relative displacement $\Delta r$ attributed to the movement of the physical sensor 122 with a velocity of v at time t may be expressed as $\Delta r(t)=vt$. As such, the received signal of the physical sensor 122 may be determined by the following equation:

$$p_1(t)=a_1(r_0+\Delta r(t))s_0(t)+q(t), 0 \leq t \leq \Delta T,\quad \text{EQ. 1}$$

where $a_1(.)$, denotes the signal steering vector towards the physical sensor 122 that determines the phase response of the acoustic source at position $r_0=(x_o, y_o)$, where $y_o$ denotes the perpendicular distance (or radius) of the source with respect to the x-axis and $x_o$ denotes the distance covered along the x-axis, where q(t), is the additive white Gaussian Noise that captures the effects of thermal and environmental noise, and where $\Delta T$ represents an acquisition window frame of the physical sensor.

At block 404, a frame decomposition operation decomposing the detected physical signals into multiple frames is performed. More particularly, as the physical sensor 122 moves within the acquisition window frame $\Delta T$, frame decomposition may be performed within $\Delta T$ to form N number of virtual sensors. At blocks 406A-406N, an array of N total virtual sensors is formed based on the frame decomposition operation described herein. A mathematical expression of the array of N total sensors may be expressed as the following equation:

$$p_{1,n}(t) = p_1\left(t + \frac{\Delta T}{N}(n-1)\right) \text{ with } 0 \leq t \leq \frac{\Delta T}{N}, \quad \text{EQ. 2}$$

where $n \in [1,N]$ is the spatial index to denote the virtual sensor number, N is the total number of virtual sensors is the virtual array, such that $\Delta T/N$ satisfies the quasi-stationary condition. Further, each respective virtual sensor of N virtual sensors is located at $[m_{1,1} \ldots m_{1,N}]$, respectively, where the location of the respective virtual sensor may be determined based on the following equation:

$$m_{1,n} = m_1 + v\frac{(n-\varepsilon)\Delta T}{N} \quad \text{EQ. 3}$$

where $\varepsilon \in [0,1]$ is the percentage of the offset from origin.

The virtual signals associated with the N virtual sensors positioned at $[m_{1,1} \ldots m_{1,N}]$ expressed based on $p_{1,n}(t)$ may be expressed based on the following equation:

$$p_1(t) = [p_{1,1}(t) \ldots p_{1,N}(t)] \text{ with } 0 \leq t \leq \frac{\Delta T}{N} \quad \text{EQ. 4}$$

In some embodiments, when the physical sensor 122 is moving at velocity v, the physical sensor 122 also moves with an acquisition window of $\Delta T=Nd/v$ to construct a virtual array with N sensors with inter-element virtual sensor spacing of d, where d is the inter element virtual sensor spacing.

At the covariance matrix estimator block 408, a covariance matrix of the plurality of virtual signals is constructed from the virtual signals obtained from EQ. 4. More particularly, the following equation builds on EQ. 4 to construct a N×N covariance matrix:

$$\hat{R}_{p_1 p_1} = E[p_1(t)p_1^H(t)] = \frac{N}{\Delta T}\int_0^{\Delta T/N} p_1(t)p_1^*(t)dt. \quad \text{EQ. 5}$$

where $(.)^H$ and $(.)^*$ correspond to a Hermitian operation and a complex conjugate transpose, respectively.

At blocks 410 and 412, a modeled transfer function of virtual signals corresponding to each respective virtual sensor of the array of virtual sensors and a temporal correction factor of the virtual signals are determined and used to calculate a virtual weight of the respective virtual sensor. At block 414, the virtual weight is then applied to the covariance matrix to adjust the covariance matrix. Further, a true steering vector of virtual signals corresponding to each respective virtual sensor is also determined and also used to adjust the covariance matrix.

At block 416, a spatial spectrum 418 indicative of the location of the leak is computed based on the adjusted covariance matrix. A beamforming technique disclosed herein may use EQ. 5 to determine a localized peak of the spatial spectrum 418, where the localized peak is indicative of the location of the leak 132. More particularly, the localized peak may be determined by performing the foregoing operations to construct the array of virtual sensors 322A-322H based on the physical sensor 122 and then searching for the peaks that indicate the location. For example, $\mathcal{R} = \{\hat{r}_0 \ldots \hat{r}_K\}$ denote the set that contains the grid location in which the spatial spectrum scanning is performed. For each location, the steering vector $a_1(\hat{r}_j)$ may be computed and applied to a Capon beamforming technique (e.g., a Minimum Variance Distortionless Response (MVDR) beamforming technique) by computing the spatial spectrum, where $$P_{Capon}^{OSA}(\hat{r}_j) = \frac{1}{a_1^H(\hat{r}_j)\hat{R}_{p_1 p_1}^{-1}a_1(\hat{r}_j)}.$$

Finally, the location of the source may be found as the argument that maximizes the spatial spectrum, where $P_{Capon}^{OSA}(\hat{r}_j)$, expressed as:

$$\hat{r}_k = \arg\max_{\hat{r}_j \in \mathcal{R}} P_{Capon}^{OSA}(\hat{r}_j) \quad \text{EQ. 6}$$

where $(.)^H$ corresponds to the Hermitian operation, where $a_1(\hat{r}_j)$ is modelled with the virtual weights $w_1(\hat{r}_j)= A(t_1)[w_{1,1}(\hat{r}_j) \ldots w_{1,N}(\hat{r}_j)]^T$ for free field corresponding to the virtual weights steering vector of the virtual sensor position at $[m_{1,1} \ldots m_{1,N}]^T$ due to the physical sensor 122, $m_1$. $w_{1,n}(\hat{r}_j)$ is the transfer function that models the time delay from position $\hat{r}_j$ to the virtual sensor position at $m_{1,n}$, and where $A(t_1)=\text{diag}(e^{j\omega t_{1,1}}, \ldots, e^{j\omega t_{1,N}})$ is the temporal correction factor with $t_1=[t_{1,1}, \ldots, t_{1,N}]$ being the time delay to synchronize the virtual sensors to a common time frame, where $\omega$ is the angular frequency of the impinging signal.

The process 400 may also be applied to a process that decomposes data from multiple virtual one-sensor arrays (e.g., sub one-sensor arrays (SOSAs). Each of the SOSAs perform estimates of the location of the leak 132 independently from one another based on readings taken at by the physical sensor 122 at different locations within the wellbore 106. That is, the physical sensor 122 continuously takes measurements as the physical sensor 122 travels downhole or uphole within the wellbore 106. The data obtained by the physical sensor 122 is decomposed at different locations within the hole to generate the SOSAs at varying downhole locations. The effect of each of the SOSAs on the combined estimate of the location of the leak 132 may be weighted based on the quality of the data received at the physical sensor 122 at each downhole location. For example, an indication that a first location received a stronger signal than a second location may generally indicate that the first location is closer to the leak 132 than the second location. Accordingly, a direction of arrival estimate provided by the SOSA generated at the first location is weighted more favorably in a calculation of the combined estimate than a direction of arrival estimate provided by the SOSA generated at the second location.

Figure 5:
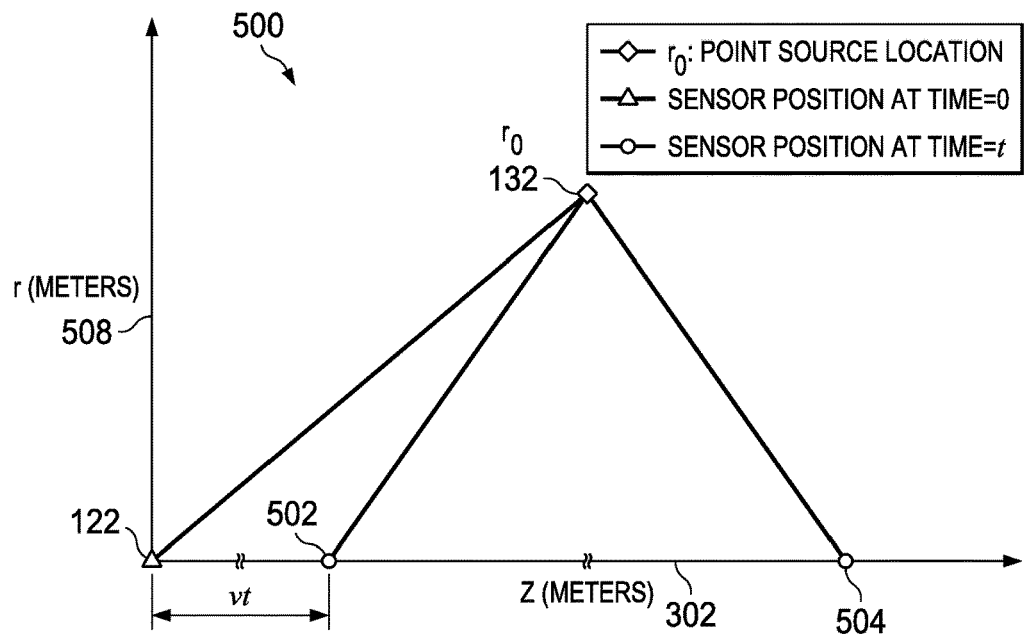
FIG. 5 is a schematic view of a moving sensor configuration of a physical sensor as the physical sensor travels within the wellbore.

FIG. 5 is a schematic view of a moving sensor configuration 500 of the physical sensor 122 and a location $r_0$ of the leak 132 as the physical sensor 122 travels along a longitudinal axis (z-axis) 302 of the wellbore at a velocity equal to v. The location $r_0$ of the leak 132 is depicted at a depth within the wellbore 106 indicated by the z-axis 302, and a perpendicular location, with respect to the z-axis 302, indicated by an r-axis 508. As the physical sensor 122 moves within the wellbore 106, the physical sensor 122 continuously records an acoustic signal at a high sampling rate. Each of the samples corresponds to the sample at a particular time and space instance. A SOSA may be constructed at any of the samples generated by the physical sensor 122. By constructing the SOSAs, the impinging signal (i.e., a signal effect generated by the leak 132) is approximated as a far-field signal approaching the SOSAs. After the construction of the SOSAs, a covariance matrix is computed using the samples provided by the SOSAs. Any beamforming algorithms (e.g., Capon, MUSIC, Spatial matched filter, etc.) may be applied to a dataset of the SOSAs to perform a direction of arrival estimation of the location $r_0$ relative to each of the SOSAs.

Figure 6A:
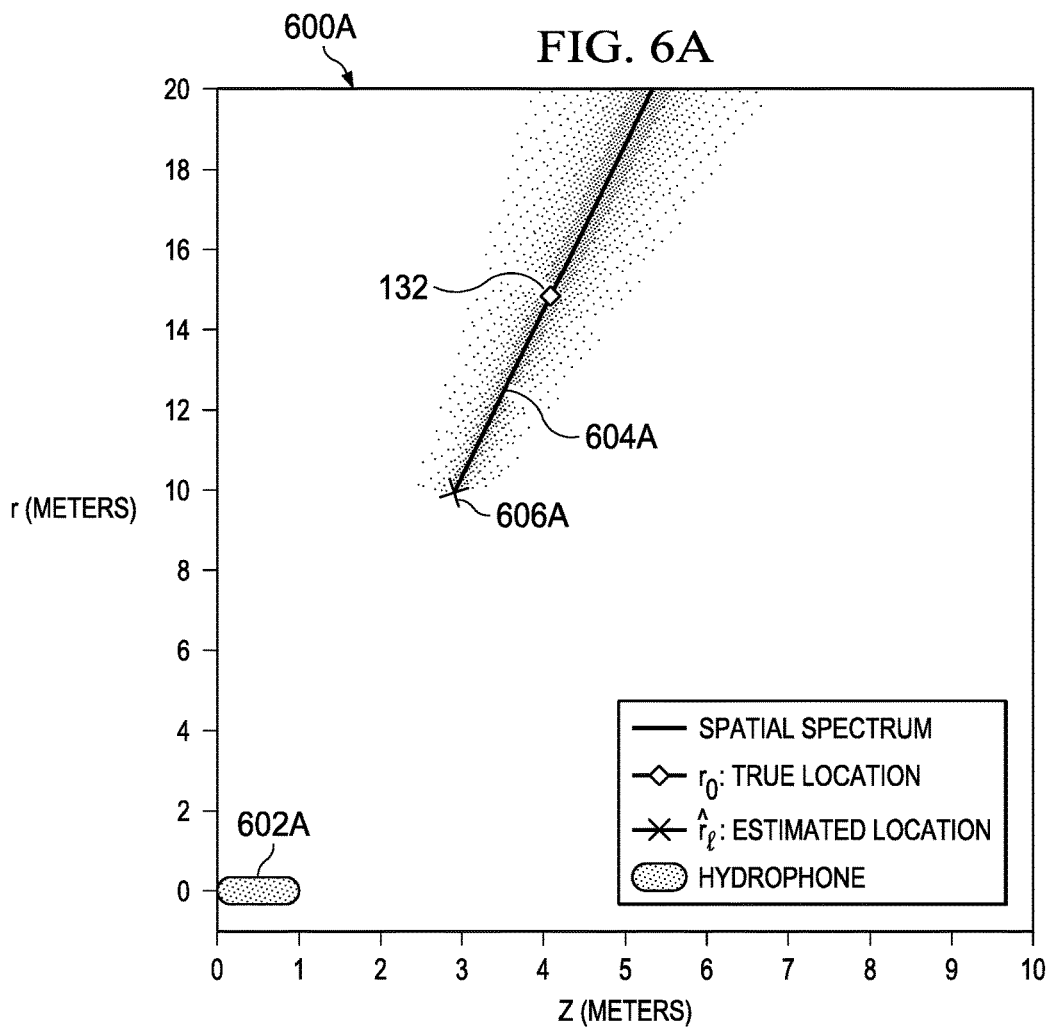
FIG. 6A is a schematic view of a sub one-sensor array (SOSA) configuration and a corresponding spatial spectrum.

FIG. 6A is a schematic view of a sub one-sensor array (SOSA) configuration 600A. A SOSA 602A collects data from the physical sensor 122 and the virtual sensors 322B-322H. While the virtual sensor 322H indicates a total of 8 sensors for the SOSA 602A (i.e., one physical sensor and seven virtual sensors), there may be more or fewer sensors used in an embodiment to generate a direction of arrival estimate 604A. The direction of arrival estimate 604A is represented as a spatial spectrum, where darker shading of the spatial spectrum represents a greater likelihood that a direction of arrival of the leak 132 with respect to the SOSA 602A runs through a specific location of the spatial spectrum. For example, the direction of arrival estimate 604A may be represented by a straight line that runs from the SOSA 602A through the darkest portion of the spatial spectrum. In the illustrated embodiment, the SOSA 602A is located near a surface of the wellbore 106. Also provided is an estimate 606A of a location of the leak 132. As indicated in FIG. 6A, the estimate 606A is along the direction of arrival estimate 604A, but the estimate 606A is off from the location of the leak 132 by 1 meter in a direction of the z-axis and by 2.5 meters in a direction of the r-axis.

Figure 6B:
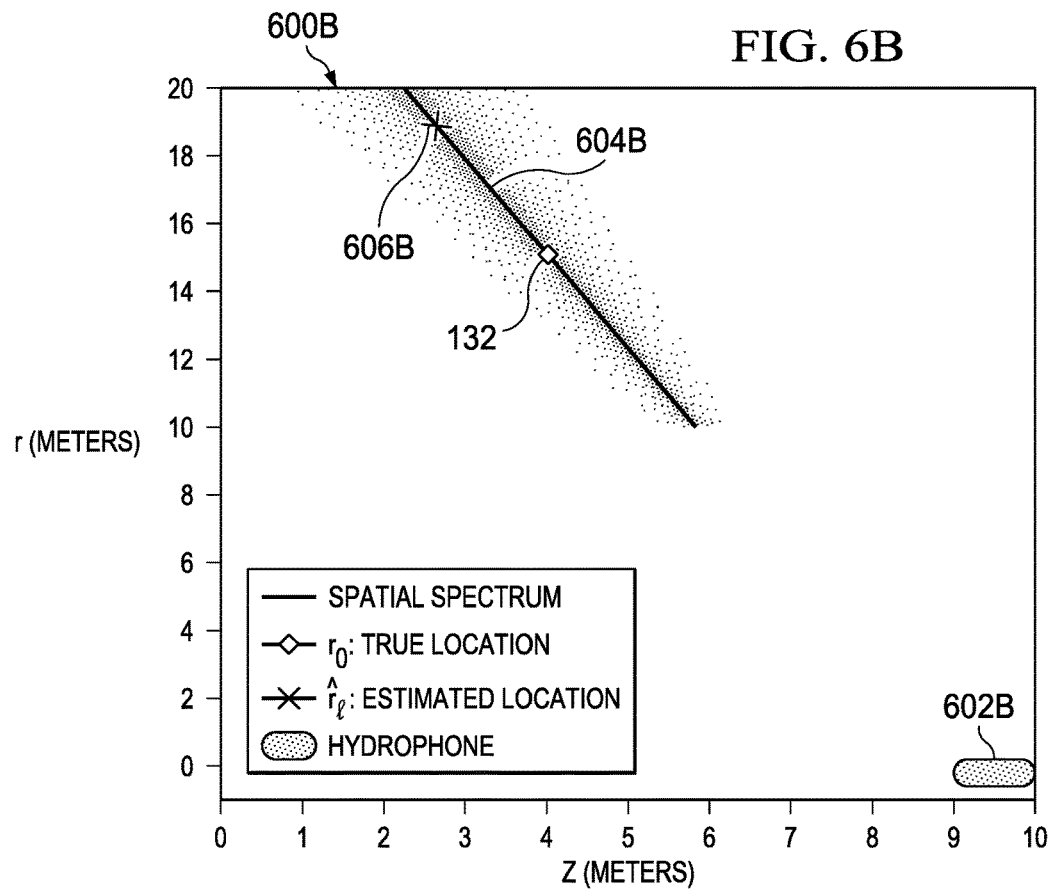
FIG. 6B is a schematic view of another SOSA configuration and a corresponding spatial spectrum.

FIG. 6B is a schematic view of a SOSA configuration 600B. A SOSA 602B is located further downhole from the SOSA 602A, and the SOSA 602B is also positioned further downhole from the leak 132. Accordingly, a direction of arrival estimate 604B has a negative slope in comparison to a slope of the direction of arrival estimate 604A. An estimate 606B of the location of the leak 132 is located along the direction of arrival estimate 604B, but the estimate 606B is off from the leak 132 by approximately 1.5 meters in the direction of the z-axis and two meters in the direction of the r-axis.

As illustrated in FIGS. 6A and 6B, the spatial spectrums of the direction of arrival estimates 604A and 604B are similar in intensity. However, a weighting process applied to the individual direction of arrival estimates 604 that are used to estimate the location of the leak 132 may weight the direction of arrival estimates 604 based on intensities of the spatial spectrums. For example, spatial spectrums with greater intensity will receive more weight than the spatial spectrums with lesser intensity when determining the location of the leak 132. Weighting the direction of arrival estimates 604 limits impact of lower performing SOSAs 602 (e.g., SOSAs 602 located far from the location of the leak 132) and increases the impact of higher performing SOSAs 602.

Figure 7:
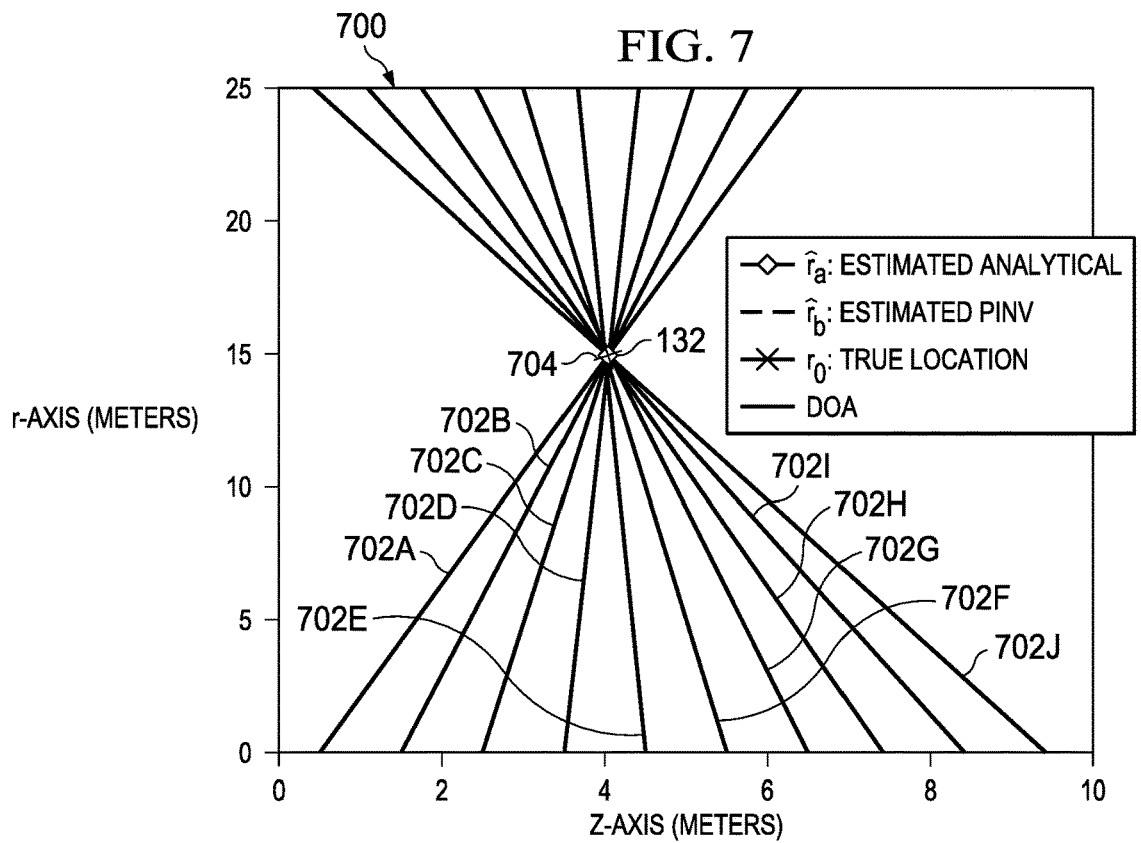
FIG. 7 is a chart including a set of direction of arrival estimates generated from the SOSA configurations.

FIG. 7 is a chart 700 including direction of arrival estimates 702A-702I generated from the SOSAs 602. A localization estimate of the leak 132 may be achieved by combining the direction of arrival estimates 702A-702I using an analytical approach or a pseudo-inverse operation. Such a combination results in an optimum source location 704 based on the direction of arrival estimates 702A-702I. As used herein, the term "optimum" is measured in terms of the source location 704 being at a minimum $\ell_2$-norm distance between all of the direction of arrival estimates 702A-702I.

As illustrated, the direction of arrival estimates 702A-702I are all equally weighted such that each of the direction of arrival estimates 702A-702I provide an equal contribution to the overall localization estimate of the leak 132. Equal weighting provides sufficient results when data from the SOSAs 602 is collected under a high signal-to-noise environment. However, under a low signal-to-noise environment, accuracy of the estimations provided by the SOSAs 602 may suffer. Accordingly, weighting the direction of arrival estimates 702A-702I in favor of estimates with greater confidence may be beneficial in the low signal-to-noise environment to limit effects of potentially inaccurate data on the estimate of the source location 704. This weighting may be accomplished with, for example, a Cramer-Rao bound stitching of the array aperture, a Kalman filter gain, a heuristic approach, or any other suitable weighting technique.

Figure 8:
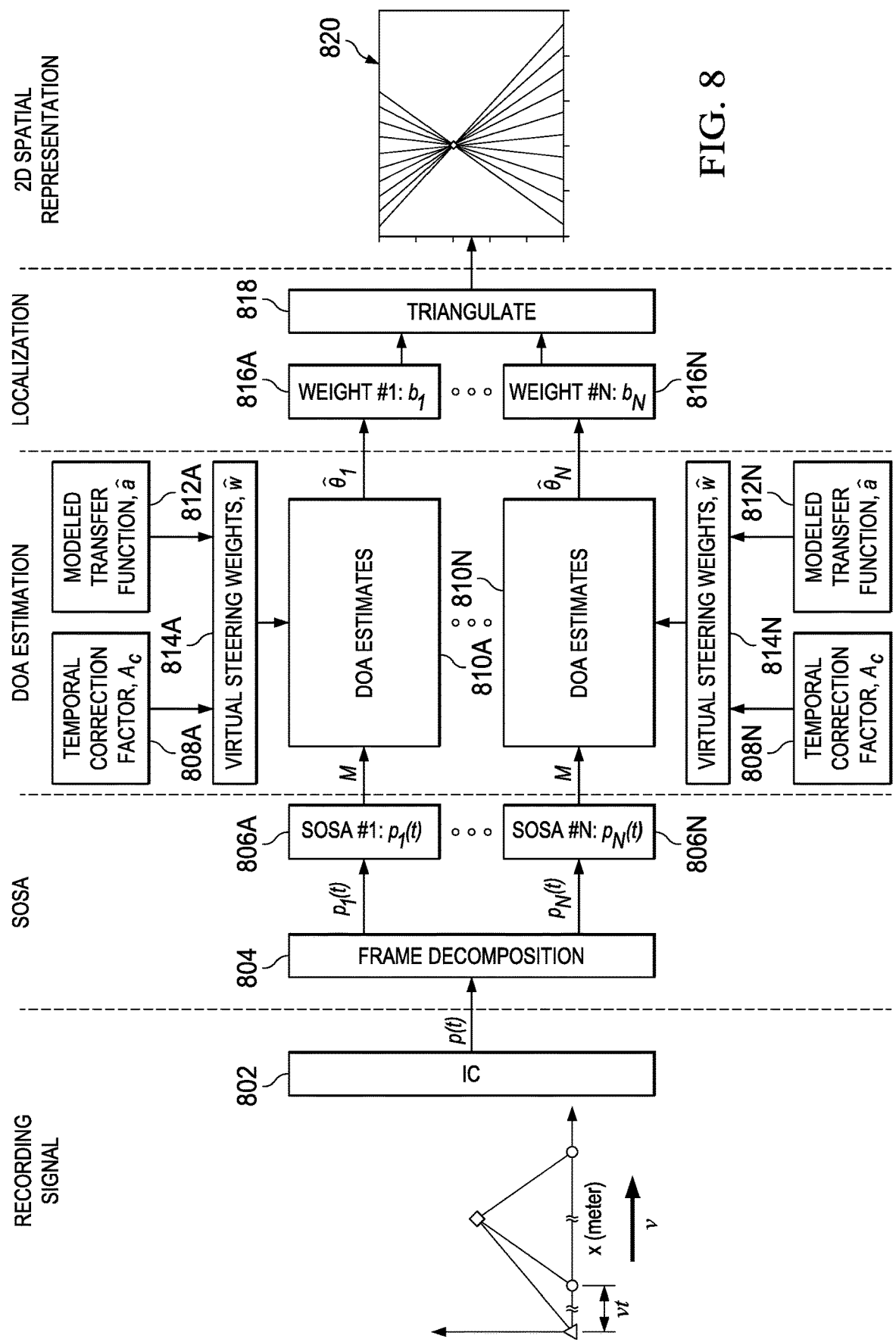
FIG. 8 illustrates a block diagram of a process for utilizing multiple SOSAs formed from one physical sensor to compute a location estimation of a leak.

FIG. 8 illustrates a block diagram of a process 800 for utilizing multiple SOSAs formed from one physical sensor, such as the physical sensor 122, to compute a location estimation of a leak, such as the first leak 132 of FIG. 1. At block 802, initial calculations are performed to determine the positions of the physical sensor 122 for data used to generate the SOSAs. In the example of FIG. 8, the physical sensor 122 ($m_1$) is initially located at an origin where the location of the physical sensor 122 across two perpendicular axes x and y is expressed as (x, y)=(0, 0). The physical sensor 122 is operable to detect a near field leaking source signal in free-field propagation, $S_0(t)$, where the leaking source signal is located at a spatial position of $r_0=(x_0, y_0)$. Further, the relative displacement Δr attributed to the movement of the physical sensor 122 with a velocity of v at time t may be expressed as Δr(t)=vt. As such, the received signal of the physical sensor 122 may be determined by the following equation:

$$p(t) = s(t)e^{\frac{j\omega}{c}r(t)} + q(t), \qquad \text{EQ. 7}$$

where $r(t) = \|r_0 + vt\|_2$ is a Euclidean distance between the source and sensor at time t moving with velocity v in the Cartesian coordinate system; $s(t) = e^{j\omega t}$ is a source signal; q(t) is the additive white Gaussian Noise; and $\omega/c$ is a wavenumber of the source signal as the sensor moves within a recording window of T seconds.

At block 804, a frame decomposition operation decomposing the detected physical signals into multiple frames is performed to generate the sub one-sensor arrays (SOSAs) for each location of the physical sensor 122 at which data is obtained and used in the localization estimate. More particularly, as the physical sensor 122 moves within the acquisition window frame ΔT, frame decomposition may be performed within ΔT to form M number of virtual sensors.

At blocks 806A-806N, N SOSAs, each using an array of M total virtual sensors, are formed based on the frame decomposition operation described herein. The collected samples at each location of the physical sensor 122 used for generating a SOSA are decomposed into N frames, such that each nth frame is defined as:

$$p_n(t) = p(t + \Delta T(n-1)), \quad 0 \le t \le \Delta T, \qquad \text{EQ. 8}$$

where $n \in [1, N]$. The value of N is chosen such that $\Delta T = T/N$ satisfies the quasi-stationary condition. Each nth frame is further decomposed into M virtual sensors with the mth modeled virtual sensor modelled as:

$$p_{m,n}(t) = p_n(t + \Delta T_M(m-1)), \quad 0 \le t \le \Delta T_M \qquad \text{EQ. 9}$$

where $m \in [1, M]$, and $\Delta T_M = \Delta T/M$. In this manner, the nth SOSAs can be formed with M virtual sensors, which is expressed compactly as:

$$p_n(t) = [p_{1,n}(t) \ldots p_{m,n}(t) \ldots p_{M,n}(t)]^T, \quad 0 \le t \le \Delta T_M,$$
$$n \in [1, N], \qquad \text{EQ. 10}$$

where $(.)^T$ denotes a transpose operation.

At blocks 808A-808N, temporal correction factors of the virtual signals are determined and used to correct the SOSAs for an observed temporal-delay component. The observed temporal-delay component is correctable with the following equation:

$$A_c = \text{diag}([e^{-j\omega \Delta T_M 0} \ldots e^{-j\omega \Delta T_M(M-1)}]), \qquad \text{EQ. 11}$$

where $A_c$ is a temporal correction factor.

At blocks 810A-810N, direction of arrival estimates are determined based on the SOSAs generated at block 806A-806N and the temporal correction factor $A_c$ determined at blocks 808A-808N. The direction of arrival estimates may be achieved through modified convention beamforming techniques. These techniques may include a delay and sum, Capon, MUSIC, Root-MUSIC, Minimum-Norm, ESPRIT, Root-ESPRIT, Maximum-likelihood, or any other adequate technique.

By way of example, a modified Capon is used to solve the direction of arrival estimation. $\Theta = \{\hat{\theta}_1 \ldots \hat{\theta}_L\}$ denotes a set that contains a searching angle space ranging from 0 degrees to 180 degrees within each SOSA search area in a free field. In addition, $\hat{v} = (\hat{v}_x, 0)$ denotes an estimated velocity of the physical sensor 122 along an x-axis of the Cartesian coordinate system. The corresponding free field steering vector to each discrete point is then modeled as:

$$a(\hat{\theta}_j) = \begin{bmatrix} e^{j\frac{\omega}{c}\cdot(\hat{v}_x \Delta T_M)\cdot 0 \cos\hat{\theta}_j} \\ \vdots \\ e^{j\frac{\omega}{c}\cdot(\hat{v}_x \Delta T_M)\cdot(M-1)\cos\hat{\theta}_j} \end{bmatrix}, \qquad \text{EQ. 12}$$

where $\hat{\theta}_j \in \Theta$ is the current scanning angle in the search area, $\omega$ is the angular frequency, and c is the speed of acoustic propagation in the medium.

Beamformer energy is then computed at each direction of arrival by construction an M×M theoretical covariance matrix of the nth SOSA. The theoretical covariance matrix is generally estimated with the following sample covariance matrix:

$$\hat{R}_{SOSA}^{(n)} = A_c \left\{ \frac{1}{\tau} \sum_{t=1}^{\tau} p_n(t) p_n^H(t) \right\} A_c^H = A_c \hat{R}_{pp}^{(n)} A_c^H, \qquad \text{EQ. 13}$$

where $\tau$ is a total number of samples available in the nth SOSA, and $(.)^H$ is the Hermitian operator. Subsequently, the direction of arrival of the source (e.g., the first leak 132) is determined through standard beamforming such as the Capon beamformer:

$$\hat{\theta}_n = \arg\max_{\hat{\theta}_j \in \mathcal{R}} \frac{1}{\hat{a}^H(\hat{\theta}_j)[\hat{R}_{SOSA}^{(n)}]^{-1}\hat{a}(\hat{\theta}_j)}, \qquad \text{EQ. 14}$$

where $[.]^{-1}$ is the matrix inverse operator, and $\hat{a}(\hat{\theta}_j)$ is the modeled transfer function obtained at blocks 812A-812N that captures the source propagation from the current scanning angle $\hat{\theta}_j$ to the nth SOSA. In an embodiment, the direction of arrival of the source may also be represented by the following equation:

$$\hat{\theta}_n = \arg\max_{\hat{\theta}_j \in \mathcal{R}} \frac{1}{\hat{w}^H(\hat{\theta}_j)[\hat{R}_{pp}^{(n)}]^{-1}\hat{w}(\hat{\theta}_j)}, \qquad \text{EQ. 15}$$

where $\hat{w}(\hat{\theta}_j) = A_c^{-1}\hat{a}(\hat{\theta}_j) = A_c^H \hat{a}(\hat{\theta}_j)$, and $\hat{w}(\hat{\theta}_j)$, which is received at blocks 814A-814N, can be interpreted as beamformer virtual vector weights for the nth SOSA direction of arrival estimation.

Upon determining the direction of arrival estimation of each of the SOSAs, at blocks 816A-816N, a weight may be assigned to each of the direction of arrival estimates. As described above with reference to FIG. 7, the direction of arrival estimates may be equally weighted when data from the SOSAs is collected under a high signal-to-noise environment. However, under a low signal-to-noise environment, accuracy of the estimations provided by the SOSAs may suffer. Accordingly, weighting the direction of arrival estimates in favor of estimates with greater confidence may be beneficial in the low signal-to-noise environment to limit effects of potentially inaccurate data on the estimate of the source location (i.e., a location of the first leak 132). This weighting may be accomplished with, for example, a Cramer-Rao bound stitching of the array aperture, Kalman filter gain, a heuristic approach, or any other suitable weighting technique.

At block 818, localization of the source is achieved by triangulating all of the direction of arrival estimates determined at blocks 810A-810N. Triangulating all of the direction of arrival estimates involves determining an intersection between all of the direction of arrival estimates. One approach for triangulation is using a solution to a minimization problem. This approach involves first expressing the direction of arrival estimates as equations of lines span by the direction of arrival estimates and finding a coordinate that minimizes all distances $d_1, \ldots, d_n, \ldots, d_N$ between the lines span by all of the direction of arrival estimates. Mathematically, this is expressed as:

$$\min_{x, y} \sum_{n=1}^{N} g_n^2 d_n^2 = \min_{x, y} \sum_{n=1}^{N} g_n^2 \frac{(m_n x + b_n y + c_n)}{m_n^2 + b_n^2}, \qquad \text{EQ. 16}$$

where $m_1, \ldots, m_N$ and $c_1, \ldots, c_N$ are N sets of gradients and y-intercepts, respectively, with each nth element span by the nth direction of arrival estimate. $b_1, \ldots, b_N = [-1, \ldots, -1]$ is a vector of negative ones. In equation 16, $g_n$, is the weight used to determine the direction of arrival estimate contribution to the triangulation of the source location, as determined at blocks 816A-816N. In an embodiment, the weights may be set with gain $g_n = 1$ when the signal-to-noise ratio of the environment is high.

Equation 16 may be compactly represented by the following equation:

$$\min_{x, y} \sum_{n=1}^{N} k_n (m_n x + b_n y + c_n)^2, \qquad \text{EQ. 17}$$

and the solution of equation 17 is expressed as the following:

$$x = -\frac{(B\gamma - \beta C)}{B^2 - A\beta}, \quad y = +\frac{(A\gamma - BC)}{B^2 - A\beta} \qquad \text{EQ. 18}$$

where:

$$A = \sum_n k_n m_n^2,$$

$$B = \sum_n k_n m_n b_n,$$

$$C = \sum_n k_n m_n c_n,$$

$$\alpha = \sum_n k_n m_n b_n,$$

$$\beta = \sum_n k_n b_n^2,$$

$$\gamma = \sum_n k_n b_n c_n,$$

$$k_n = \frac{g_n^2}{m_n^2 + b_n^2}$$

EQ. 19

The resulting value of x and y represents the coordinate of the source with respect to the origin defined in the initial calculation of block 802. The solution of x and y can be achieved through a pseudo-inverse operation with proper normalization. Triangulation of the direction of arrival estimates is presented visually as a two dimensional spatial representation in chart 820.

Figure 9:
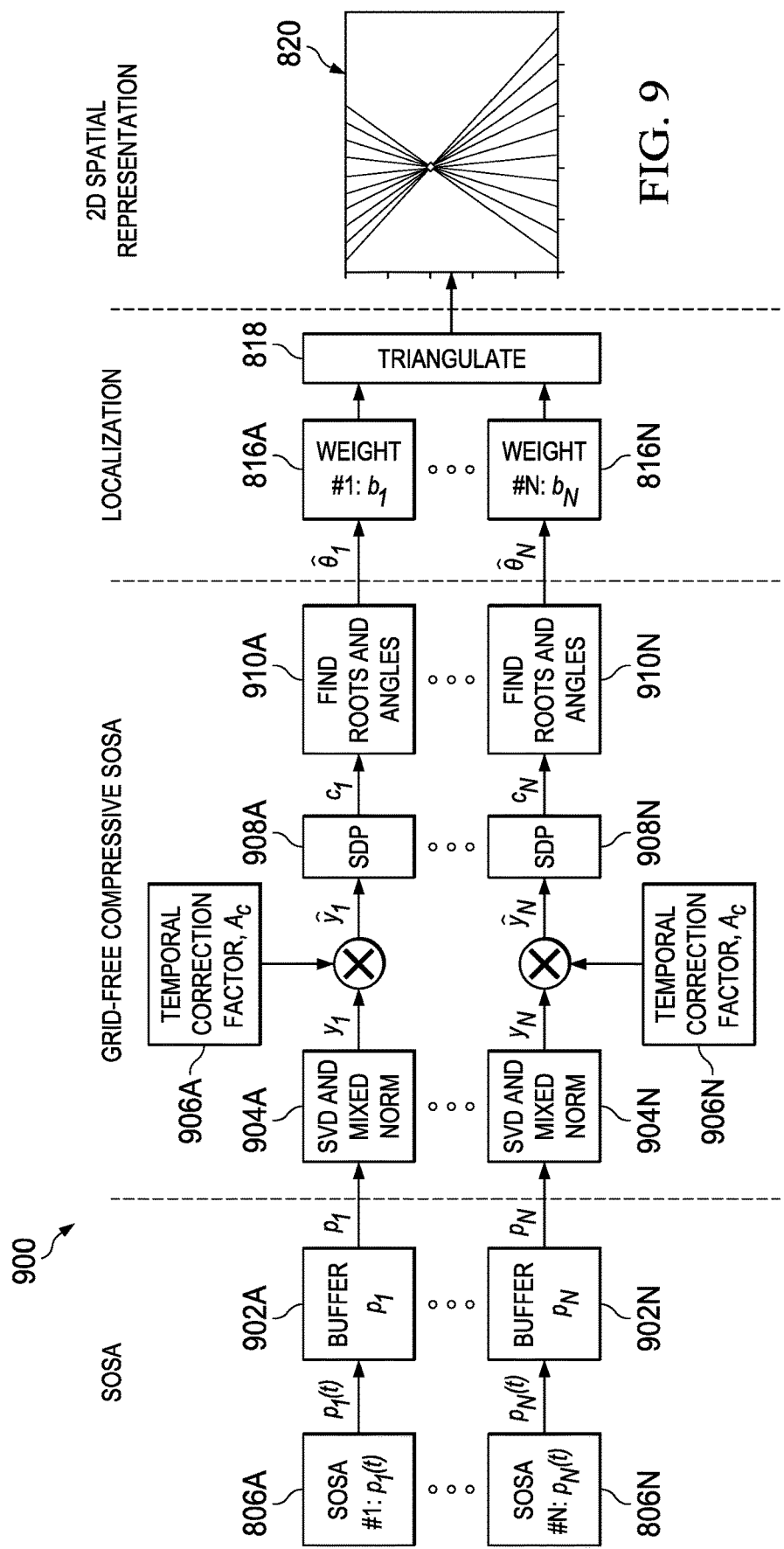
FIG. 9 illustrates a block diagram of a process for utilizing multiple SOSAs formed from one physical sensor to compute a location estimation of a leak using a grid-free compressive beamforming method.

Turning now to FIG. 9, a block diagram of a process 900 for utilizing multiple SOSAs formed from one physical sensor, such as the physical sensor 122, to compute a location estimation of a leak, such as the first leak 132 of FIG. 1, is illustrated. The process 900 depicts a modified grid-free compressive beamforming method for determining the location estimation of the leak. The process 900 may be implemented after blocks 806A-806N are completed in the process 800 to replace the modified conventional beamforming techniques of process 800 (e.g., blocks 810-814).

After the N SOSAs are formed at blocks 806A-806N based on the frame decomposition operation, the data from the SOSAs is collected in matrices at buffer blocks 902A-902N. The data matrix of the collected nth SOSA is represented by the following equation:

$$P_n = \begin{bmatrix} e^{j\omega \Delta T_M \cdot 0} & 0 & 0 \\ 0 & \ddots & 0 \\ 0 & 0 & e^{j\omega \Delta T_M \cdot (M-1)} \end{bmatrix}$$

$$\begin{bmatrix} e^{j\omega \cdot 0} e^{j\frac{\omega}{c} r(\Delta T_M \cdot 0)} & \cdots & e^{j\omega \Delta T_M} e^{j\frac{\omega}{c} r(\Delta T_M \cdot 0)} \\ \vdots & \ddots & 0 \\ e^{j\omega \cdot 0} e^{j\frac{\omega}{c} r(\Delta T_M \cdot (M-1))} & \cdots & e^{j\omega \Delta T_M} e^{j\frac{\omega}{c} r(\Delta T_M \cdot M)} \end{bmatrix}$$

$$= A_c^H A_s,$$

EQ. 20

At blocks 904A-904N, singular value decomposition (SVD) and mixed norm representations of equation 20 are used to construct a sparse signal representation that is tractable and uses all of the data samples. To illustrate, the SVD is applied to equation 20 to arrive at the following equation:

$$P_n = A_c^H A_n = A_c^H U_n \Sigma_n V_n^H \qquad \text{EQ. 21}$$

where $A_n = U_n \Sigma_n V_n^H$. When keeping only a reduced M×K dimensional matrix, $P_n^{SV} = A_c^H U_n \Sigma_n D_k = A_c^H A_{sv_n}$, where $D_k = [I_K \; 0]$. $I_k$ is a K×K identity matrix and 0 is a K×($\Delta T_M - K$) matrix of zeros.

After applying the SVD, a dimension of $P_n^{SV}$ is further reduced into a vector by the following mixed norm representation:

$$y_n = A_c^H [\Sigma_{k=1}^{K} (P_n^{SV}(k))^p]^{1/q}, \qquad \text{EQ. 22}$$

where $P_n^{SV}(k)$ is the kth column vector of $P_n^{SV}$. p and q represent the order of the mixed norm. In an embodiment, p and q are set to p, q=1. Subsequently, y is modelled in a continuous angular space as:

$$y_n \cong A_c^H \mathcal{F}_M x_n = A_c^H \sum_{i=1}^{I} x_i^{(n)} e^{j\frac{\omega}{c} d(m-1) \cos \theta_i}, \qquad \text{EQ. 23}$$

Multiplying equation 23 with the temporal correction factor (i.e., equation 11) provided by blocks 906A-906N, the following equation is achieved:

$$\hat{y}_n \cong A_c y_n = \sum_{i=1}^{I} x_i^{(n)} e^{j\frac{\omega}{c} d(m-1) \cos \theta_i}, \qquad \text{EQ. 24}$$

Equation 24 provides a standard form of a grid-free compressive beamforming that is cast as a semi-definite programming (SDP) representation at blocks 908A-908N.

A direction of arrival estimate may then be achieved by acquiring sets of complex coefficients by solving the SDP representation, by identifying support of the complex coefficients that lie on a unit circle, and by finding an angle of the identified support at blocks 910A-910N. The SDP representation may be written as the following equation:

$$\max_{c_n, Q} \text{Re}(c_n^H \hat{y}_n) - \epsilon \|c_n\|_2 \qquad \text{EQ. 25}$$

$$\text{Subject to } \begin{bmatrix} Q_{M \times M} & c_{M \times 1} \\ c_{1 \times M}^H & 1 \end{bmatrix} \succcurlyeq 0$$

$$\sum_{i=1}^{M-j} Q_{i,i+j} = \begin{cases} 1, & j = 0 \\ 0, & j = 1, \dots, M-1 \end{cases}$$

where $\epsilon$ is a bounded value of the noise and potential error in a near-field far-field approximation, and $\|.\|_2$ is the $\ell_2$-norm operator.

After determining the direction of arrival estimates using equation 25, the direction of arrival estimations are weighted and triangulated at blocks 816A-816N and block 818, respectively, as described above with respect to FIG. 8. Further, the triangulation of the direction of arrival estimates may be represented as the two dimensional spatial representation 820.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a method of downhole leak detection, comprising: obtaining physical signals detected by a single physical sensor traveling along a wellbore; performing a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance; performing a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance; computing a first direction of arrival estimate of the first location of the single physical sensor relative to a location of a downhole leak and a second direction of arrival estimate of the second location of the single physical sensor relative to the location of the downhole leak; and triangulating the first direction of arrival estimate and the second direction of arrival estimate to estimate the location of the downhole leak.

Clause 2, the method of clause 1, wherein the first direction of arrival and the second direction of arrival are determined utilizing a beamforming technique to determine a localized peak of a spatial spectrum, wherein the localized peak is indicative of the location of the downhole leak.

Clause 3, the method of clause 1 or 2, further comprising determining an approximate radial distance of the downhole leak relative to the single physical sensor, wherein the location of the leak is expressed by the approximate radial distance.

Clause 4, the method of any one of clauses 1-3, further comprising utilizing a modified beamforming technique to compute the first direction of arrival estimate and the second direction of arrival estimate.

Clause 5, the method of at least one of clauses 1-4, further comprising utilizing a modified grid-free beamforming method to compute the first direction of arrival estimate and the second direction of arrival estimate.

Clause 6, the method of at least one of clauses 1-5, further comprising: determining a temporal correction factor for the first plurality of virtual signals corresponding to the first array of virtual sensors and the second plurality of virtual signals corresponding to the second array of virtual sensors; determining a modeled transfer function of the first plurality of virtual signals and the second plurality of virtual signals corresponding to the first array of virtual sensors and the second array of virtual sensors; calculating a virtual steering weight of the virtual sensors relative to the physical sensor based on the temporal correction factor and the modeled transfer function; and applying the virtual weight to one or more covariance matrices that represent the first plurality of virtual signals and the second plurality of virtual signals corresponding to the first array of virtual sensors and the second array of virtual sensors.

Clause 7, the method of at least one of clauses 1-6, wherein obtaining the signals of the first physical sensor comprises determining signals at at least two locations along a wellbore and a relative displacement of the first physical sensor due to movement of the first physical sensor within the wellbore.

Clause 8, the method of at least one of clauses 1-7, comprising synchronizing the virtual signals of the first array of virtual sensors and the second array of virtual sensors by constructing a first covariance matrix and a second covariance matrix based on the plurality of the virtual signals obtained from the first frame decomposition operation of the first set of physical signals and the second frame decomposition operation of the second set of physical signals.

Clause 9, the method of at least one of clauses 1-8, wherein the virtual distance of each respective sensor of N virtual sensors relative to the single physical sensor is $$[m_{1,1} \quad \dots \quad m_{1,N}], \text{ wherein } m_{1,n} = m_1 + v\frac{(n-\varepsilon)\Delta T}{N}.$$

Clause 10, the method of at least one of clauses 1-9, wherein the single physical sensor is traveling along the wellbore at an approximately constant velocity.

Clause 11, a downhole leak detection system comprising: a leak detector comprising a physical sensor operable to travel along a wellbore and detect physical signals indicative of a leak proximate the physical sensor; and a processor communicatively coupled to the leak detector and operable to: perform a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance; perform a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance; compute a first direction of arrival estimate of the first location of the single physical sensor relative to a location of a downhole leak and a second direction of arrival estimate of the second location of the single physical sensor relative to the location of the downhole leak; and triangulate the first direction of arrival estimate and the second direction of arrival estimate to estimate the location of the downhole leak.

Clause 12, the downhole leak detection system of clause 11, wherein the processor is further operable to: determine a temporal correction factor for the first plurality of virtual signals corresponding to the first array of virtual sensors and the second plurality of virtual signals corresponding to the second array of virtual sensors; determine a modeled transfer function of the first plurality of virtual signals corresponding to the first array of virtual sensors and the second plurality of virtual signals corresponding to the second array of virtual sensors; calculate a virtual steering weight of the virtual sensors relative to the physical sensor based on the temporal correction factor and the modeled transfer function; and apply the virtual weight to one or more covariance matrices that represent the first plurality of virtual signals corresponding to the first array of virtual sensors and the second plurality of virtual signals corresponding to the second array of virtual sensors.

Clause 13, the downhole leak detection system of at least one of clauses 11 or 12, wherein the processor is a component of the leak detector and is disposed inside a casing of the leak detector.

Clause 14, the downhole leak detection system of clauses 11-13, wherein the processor is a component of a surface-based electronic device.

Clause 15, a non-transitory machine-readable medium comprising instructions stored therein, for execution by a processor that, when executed by the processor, causes the processor to perform operations comprising: obtaining physical signals detected by a physical sensor traveling along a wellbore; performing a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance; performing a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance; computing a first direction of arrival estimate of the first location of the single physical sensor relative to a location of a downhole leak and a second direction of arrival estimate of the second location of the single physical sensor relative to the location of the downhole leak; and triangulating the first direction of arrival estimate and the second direction of arrival estimate to estimate the location of the downhole leak.

Clause 16, the non-transitory machine-readable medium of clause 15, further comprising instructions stored therein, that, when executed by the processor, cause the processor to perform operations comprising: computing a first spatial spectrum indicative of a location of a downhole leak based on the first array of virtual signals; computing a second spatial spectrum indicative of the location of the downhole leak based on the second array of virtual signals; wherein computing the first direction of arrival is based on the first spatial spectrum, and computing the second direction of arrival is based on the second spatial spectrum.

Clause 17, the non-transitory machine-readable medium of at least one of clauses 15 or 16, further comprising instructions stored therein, that, when executed by the processor, cause the processor to perform operations comprising: utilizing a modified grid-free beamforming method to compute the first direction of arrival estimate and the second direction of arrival estimate.

Clause 18, the non-transitory machine-readable medium of any of clauses 15-17, further comprising instructions stored therein, that, when executed by the processor, cause the processor to perform operations comprising: utilizing a modified beamforming technique to compute the first direction of arrival estimate and the second direction of arrival estimate.

Clause 19, the non-transitory machine-readable medium of any of clauses 15-18, wherein triangulating the first direction of arrival estimate and the second direction of arrival estimate to estimate the location of the downhole leak comprises performing a pseudo-inverse operation on the first direction of arrival estimate and the second direction of arrival estimate.

Clause 20, the non-transitory machine-readable medium of any of clauses 15-19, further comprising instructions stored therein, that, when executed by the processor, cause the processor to perform operations comprising: weighting the first direction of arrival estimate and the second direction of arrival estimate prior to triangulating the first direction of arrival estimate and the second direction of arrival estimate.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

What is claimed is:

1. A method of downhole leak detection, comprising:
   obtaining physical signals detected by a single physical sensor moving along a wellbore;
   performing a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance;
   performing a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance;
   computing a first direction of arrival estimate of the first location of the single physical sensor relative to a location of a downhole leak and a second direction of arrival estimate of the second location of the single physical sensor relative to the location of the downhole leak;
   determining a temporal correction factor for the first plurality of virtual signals corresponding to the first array of virtual sensors and the second plurality of virtual signals corresponding to the second array of virtual sensors;
   determining a modeled transfer function of the first plurality of virtual signals and the second plurality of virtual signals corresponding to the first array of virtual sensors and the second array of virtual sensors;
   calculating a virtual steering weight of the virtual sensors relative to the single physical sensor based on the temporal correction factor and the modeled transfer function;
   applying the virtual steering weight to one or more covariance matrices that represent the first plurality of virtual signals and the second plurality of virtual signals corresponding to the first array of virtual sensors and the second array of virtual sensors; and
   triangulating the first direction of arrival estimate and the second direction of arrival estimate to estimate the location of the downhole leak.

2. The method of claim 1, wherein the first direction of arrival and the second direction of arrival are determined utilizing a beamforming technique to determine a localized peak of a spatial spectrum, wherein the localized peak is indicative of the location of the downhole leak.

3. The method of claim 1, further comprising determining an approximate radial distance of the downhole leak relative to the single physical sensor, wherein the location of the leak is expressed by the approximate radial distance.

4. The method of claim 1, further comprising utilizing a modified beamforming technique to compute the first direction of arrival estimate and the second direction of arrival estimate.

5. The method of claim 1, further comprising utilizing a modified grid-free beamforming method to compute the first direction of arrival estimate and the second direction of arrival estimate.

6. The method of claim 1, wherein obtaining the signals of the single physical sensor comprises determining signals at least two locations along a wellbore and a relative displacement of the single physical sensor due to movement of the single physical sensor within the wellbore.

7. The method of claim 1, comprising synchronizing the virtual signals of the first array of virtual sensors and the second array of virtual sensors by constructing a first covariance matrix and a second covariance matrix based on the plurality of the virtual signals obtained from the first frame decomposition operation of the first set of physical signals and the second frame decomposition operation of the second set of physical signals.

8. The method of claim 1, wherein the virtual distance of each respective sensor of N virtual sensors relative to the single physical sensor is $$[m_{1,1} \;\; \ldots \;\; m_{1,N}], \text{ wherein } m_{1,n} = m_1 + v\frac{(n-\varepsilon)\Delta T}{N},$$

wherein $n \in [1,N]$ is a spatial index to denote a respective virtual sensor number, $\varepsilon \in (0,1]$ is a percentage of the offset from origin, $\Delta T$ is an acquisition window frame, and V is a velocity of the single physical sensor.

9. The method of claim 1, wherein the single physical sensor is moving along the wellbore at an approximately constant velocity.

10. A downhole leak detection system comprising:
    a leak detector comprising a single physical sensor, the leak detector operable to move along a wellbore and detect physical signals indicative of a leak proximate the single physical sensor; and
    a processor communicatively coupled to the leak detector and operable to:
    perform a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance;
    perform a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance;
    compute a first direction of arrival estimate of the first location of the single physical sensor relative to a location of a downhole leak and a second direction of arrival estimate of the second location of the single physical sensor relative to the location of the downhole leak;
    determine a temporal correction factor for the first plurality of virtual signals corresponding to the first array of virtual sensors and the second plurality of virtual signals corresponding to the second array of virtual sensors;
determine a modeled transfer function of the first plurality of virtual signals corresponding to the first array of virtual sensors and the second plurality of virtual signals corresponding to the second array of virtual sensors;
calculate a virtual steering weight of the virtual sensors relative to the single physical sensor based on the temporal correction factor and the modeled transfer function;
apply the virtual steering weight to one or more covariance matrices that represent the first plurality of virtual signals corresponding to the first array of virtual sensors and the second plurality of virtual signals corresponding to the second array of virtual sensors; and
triangulate the first direction of arrival estimate and the second direction of arrival estimate to estimate the location of the downhole leak.

11. The downhole leak detection system of claim 10, wherein the processor is a component of the leak detector and is disposed inside a casing of the leak detector.

12. The downhole leak detection system of claim 10, wherein the processor is a component of a surface-based electronic device.

13. A non-transitory machine-readable medium comprising instructions stored therein, for execution by a processor that, when executed by the processor, causes the processor to perform operations comprising:
obtaining physical signals detected by a single physical sensor moving along a wellbore;
performing a first frame decomposition operation on a first set of physical signals of the physical signals detected by the single physical sensor at a first location to obtain a first plurality of virtual signals associated with a first array of virtual sensors, each virtual sensor of the first array of virtual sensors being located at a virtual distance relative to the first location, the virtual distance corresponding to a physical distance;
performing a second frame decomposition operation on a second set of physical signals of the physical signals detected by the single physical sensor at a second location to obtain a second plurality of virtual signals associated with a second array of virtual sensors, each virtual sensor of the second array of virtual sensors being located at a virtual distance relative to the second location, the virtual distance corresponding to a physical distance;
computing a first direction of arrival estimate of the first location of the single physical sensor relative to a location of a downhole leak and a second direction of arrival estimate of the second location of the single physical sensor relative to the location of the downhole leak; and
triangulating the first direction of arrival estimate and the second direction of arrival estimate to estimate the location of the downhole leak,
wherein the virtual distance of each respective sensor of N virtual sensors relative to $$[m_{1,1} \ \ldots \ m_{1,N}], \text{ wherein } m_{1,n} = m_1 + v\frac{(n-\varepsilon)\Delta T}{N},$$

the single physical sensor is wherein n∈[1,N] is a spatial index to denote a respective virtual sensor number, ε∈(0,1] is a percentage of the offset from origin, ΔT is an acquisition window frame, and V is a velocity of the single physical sensor.

14. The non-transitory machine-readable medium of claim 13, further comprising instructions stored therein, that, when executed by the processor, cause the processor to perform operations comprising:
computing a first spatial spectrum indicative of a location of a downhole leak based on the first array of virtual signals;
computing a second spatial spectrum indicative of the location of the downhole leak based on the second array of virtual signals;
wherein computing the first direction of arrival is based on the first spatial spectrum, and computing the second direction of arrival is based on the second spatial spectrum.

15. The non-transitory machine-readable medium of claim 13, further comprising instructions stored therein, that, when executed by the processor, cause the processor to perform operations comprising:
utilizing a modified grid-free beamforming method to compute the first direction of arrival estimate and the second direction of arrival estimate.

16. The non-transitory machine-readable medium of claim 13, further comprising instructions stored therein, that, when executed by the processor, cause the processor to perform operations comprising:
utilizing a modified beamforming technique to compute the first direction of arrival estimate and the second direction of arrival estimate.

17. The non-transitory machine-readable medium of claim 13, wherein triangulating the first direction of arrival estimate and the second direction of arrival estimate to estimate the location of the downhole leak is based on the first direction of arrival estimate and the second direction of arrival estimate.

18. The non-transitory machine-readable medium of claim 13, further comprising instructions stored therein, that, when executed by the processor, cause the processor to perform operations comprising:
weighting the first direction of arrival estimate and the second direction of arrival estimate prior to triangulating the first direction of arrival estimate and the second direction of arrival estimate.

* * * * *